United States Patent [19]

Rosenau et al.

[11] Patent Number: 5,076,238

[45] Date of Patent: Dec. 31, 1991

[54] PROCESS AND ELECTRONIC INTERNAL COMBUSTION ENGINE CONTROL SYSTEM FOR COLD-START CONTROL

[75] Inventors: Willi Rosenau, Tamm; Paul Valenta, Bietigheim; Michael Thieme, Möglingen, all of Fed. Rep. of Germany

[73] Assignee: Robert Bosch GmbH, Stuttgart, Fed. Rep. of Germany

[21] Appl. No.: 653,655

[22] Filed: Feb. 11, 1991

Related U.S. Application Data

[63] Continuation-in-part of Ser. No. 492,605, Mar. 12, 1990, abandoned, which is a continuation-in-part of Ser. No. 276,323, Oct. 28, 1988, abandoned.

[30] Foreign Application Priority Data

May 21, 1986 [DE] Fed. Rep. of Germany ....... 3617104

[51] Int. Cl.$^5$ ............................................. F02M 51/00
[52] U.S. Cl. ................................................... 123/491
[58] Field of Search ..................... 123/491, 179 L, 494, 123/435

[56] References Cited

U.S. PATENT DOCUMENTS

| | | | |
|---|---|---|---|
| 4,683,859 | 8/1987 | Tamura et al. | 123/491 |
| 4,691,680 | 9/1987 | Staerzl | 123/491 |
| 4,719,885 | 1/1988 | Nagano et al. | 123/179 L |
| 4,765,300 | 8/1988 | Fujimura et al. | 123/491 |
| 4,785,771 | 11/1988 | Ibuki et al. | 123/179 L |
| 4,873,950 | 10/1989 | Furuyama | 123/179 B |
| 4,998,522 | 3/1991 | Achleitner | 123/491 |
| 5,009,211 | 4/1991 | Kusbida et al. | 123/491 |

*Primary Examiner*—Raymond A. Nelli
*Attorney, Agent, or Firm*—Michael J. Striker

[57] ABSTRACT

With a process and an apparatus for cold-start control in an electronic internal combustion engine system, the combustion chambers of the internal combustion engine are supplied, during starting, with the increased fuel feed. The fuel feed per an ignition interval ($TD_n$) is effected by a plurality of short cold-start injection pulses generated at increased frequency at linear time intervals with respect to one another in respective ignition intervals. This frequency control replaces the normal formation of fuel injection pulses corresponding to half-periods of crankshaft rotation, during starting, and is cancelled upon commencement of preset fuel reduction thresholds. Owing to the fuel atomisation attained, there results a spontaneously ignitable mixture, so that a cold start is still possible even at extremely cold temperatures.

27 Claims, 7 Drawing Sheets

PROCESS AND ELECTRONIC INTERNAL COMBUSTION ENGINE CONTROL SYSTEM FOR COLD-START CONTROL

CROSS-REFERENCE TO RELATED APPLICATIONS

This is a continuation-in-part of application Ser. No. 492,605, filed Mar. 12, 1990, now abandoned, which in turn is a continuation-in-part of application Ser. No. 276,323, filed Oct. 28, 1988, now abandoned.

BACKGROUND OF THE INVENTION

The invention is based on a process for cold-start control in an electronic internal combustion engine system with signal generating stages for the fuel metering wherein an increased fuel proportioning is effected during starting, possibly with simultaneous or subsequent injection quantity control, a predetermined quantity of consecutive cold start short-duration injection pulses (ti*) which exceeds by a multiple the quantity of injection pulses (ti) normally issued during conventional cold starting per time unit, and/or per quantity of revolutions, and/or per quantity of ignition times, is fed per every ignition time interval to an end stage for controlling the injection valve or valves, and the generation of the quantity of cold start short-duration injection pulses (ti*) is interrupted as the ignition time intervals due to speed increase become shorter. The invention also relates to an electronic internal combustion engine control system for carrying out the process. Measures for cold-start control or cold-start boosting in fuel metering systems assigned to internal combustion engines, for instance fuel injection systems, carburator and the like, are known (German Auslegeschrift 2,511,974; German Offenlegungsschrift 3,042,245). The known systems are designed in such a way that, while starting an internal combustion engine, in particular in the lower temperature range, a supplementary feed of fuel is metered to the engine in order to compensate for possible condensation losses owing to cold intake pipe walls and cylinder inner walls. It is likewise known to preset a supplementary feed of fuel in dependence on temperature, in other words to preset initial fuel injection times $t_i$ as a function of ambient temperature during starting and subsequently to reduce the supplementary feed in dependence on engine speed and/or in dependence on time.

A similar presetting applies to the area of ignition, where likewise speed-dependent ignition adjustments during starting are known—more details on this are given in the German Offenlegungsschrift 3,042,245.

In order to meet both the requirement for ever better starting performance and the requirement for minimum possible fuel consumption, and in view of emission regulations becoming more stringent, three different phases for the supplementary fuel feed control and supplementary feed reduction during cold starting are disclosed in German Offenlegungsschrift 3,042,245. In addition, the German document discloses the temperature- and speed-dependent adjustment of the ignition angle. The amount of fuel supplied in this case follows a certain curve, which is plotted either in relation to time or to the speed of the internal combustion engine during starting, which curve may be shaped such that during a first phase a constant supplementary feed of fuel is supplied until a preset number of ignitions or revolutions of the internal combustion engine is reached (plateau region); following the plateau region there is a supplementary feed reduction phase in which the amount of fuel supplied drops linearly or follows steep-drop functions up to a transition region, which commences for example upon reaching an upper starting speed and characterizes the transition into so-called after-starting enrichment or warm running. In a corresponding way, in the ignition system there occurs an increasing advanced adjustment in a lower speed range and a retarded adjustment which becomes greater toward higher temperature.

The preset characteristic curves and functions involved here are sometimes difficult to realize and are also complicated, inasmuch as a speed-dependent function and a function dependent on the number of ignitions have to be taken into account at least in the region of the supplementary fuel feed reduction. At the same time, the number of ignitions in the plateau region (cold-starting range I) has to be taken into account, or, in order to be able to carry out the transition from the plateau region to the supplementary fuel feed reduction, a cold-start speed threshold $NKS=f(n)$ has to be taken into account.

Such a multiplicity of cold-start functions is complex and makes the control systems expensive even if, as is usual in the case of modern computer-controlled internal combustion engine control systems, the respective functions and values can be called from a memory at certain program points.

Furthermore however, the problem arises with the known cold-start control systems that they issue the requisite and calculated amount of fuel according to the respective operating conditions and deliver the fuel only once-per-ignition by a correspondingly adjusted opening of the respective injection valve, which at subzero temperatures can result in the production of a problematic ignitable mixture, particularly in the case of certain engine types (for instance with critical spark plug position); consequently, the adaptation of the cold-start control systems (CSC systems) is often very difficult in the case of certain engine types, owing to the design of the combustion space and the poor spark plug position, so that the cold-start limit at which an internal combustion engine still starts up can also be problematic. The reason for this is that the possibility cannot be excluded that the fuel injected, sometimes in considerable amounts, can also reach the spark plug in liquid form and then extinguish the ignition spark or that an ignitable mixture simply cannot be formed.

SUMMARY OF THE INVENTION

An object of the invention is therefore based on achieving a simplification of the known cold-start control (CSC) and also ensuring that when the cold-start temperature limit is lowered, an ignitable mixture can always be introduced into the combustion space The invention achieves this object in that the fuel quantity to be injected out per an ignition time interval during the starting phase is divided into equal fuel doses metered according to a sequence of cold start short-duration injection pulses (ti*) having a uniform or constant time interval (y) relative to one another, and the constant time interval (y) is independent from a pre-given division coefficient or divisor (z) such that more cold start short-duration injection pulses fall into long ignition time intervals and fewer cold start short-duration injection pulses fall into short ignition time intervals. The process according to the invention has the advantage that, as empirical investigations have shown, a considerable lowering of the cold-start temperature limit from, in numerical values, −22° C., which is achieved with the known cold-start control systems, to −28° C. could be attained (test conducted on Volvo B23F with automatic gearbox and lead-free winter petrol).

The use of the invention succeeds in attaining direct spontaneous starts even in the case of such engine types with which it could not otherwise have been possible to start the internal combustion engine on the basis of conventional cold-start systems and certain temperature conditions.

Along with these advantages, the invention also produces a drastic simplification in the known cold-start control systems with the advantage that a flooding of the engine with fuel is avoided by attaining large wetted surfaces in the combustion space and intake pipe area.

Furthermore, the invention makes it possible to dispense with the very accurate coordination of factors, previously necessary, in forming the start characteristic; the internal combustion engine no longer reacts as sensitively as was to be expected and was the case before. In other words, the very precise orientation to certain specific cold-start curve progressions which previously could ensure starting in critical conditions, is no longer necessary, the starting behaviour of internal combustion engines becomes uncritical even at low and very low temperatures.

The difficult-to-apply speed-dependent and ignition number-dependent functions for the transition region (steep-drop region GKS=f(n) and HKS=f (number of TD ignitions) prove to be dispendable, as does the function Z=number of ignitions in the cold-start range I (plateau region) and the determination of the speed threshold NKS=f(n) threshold for the transition from range I to range II.

Advantageous further developments and improvements of the invention are possible by additional measures. The simple realisation of the multiple short-duration injection pulses ti* by a time base or slot pattern formed by a computer and with which the final stage actuating the injection valves is initiated, is particularly advantageous.

BRIEF DESCRIPTION OF THE DRAWINGS

Exemplary embodiments of the invention are represented in the drawing and will be explained in more detail in the following description.

DESCRIPTION OF THE PREFERRED EMBODIMENTS

The following will deal specifically with a control signal generation for starting an internal combustion engine having an electronic control system (such as, for example, the assignee's fuel injection system known as LH-Jetronic). In this system, the fuel is metered via injection valves, which are intermittently controlled by pulse-width modulated signals.

Figure 1:
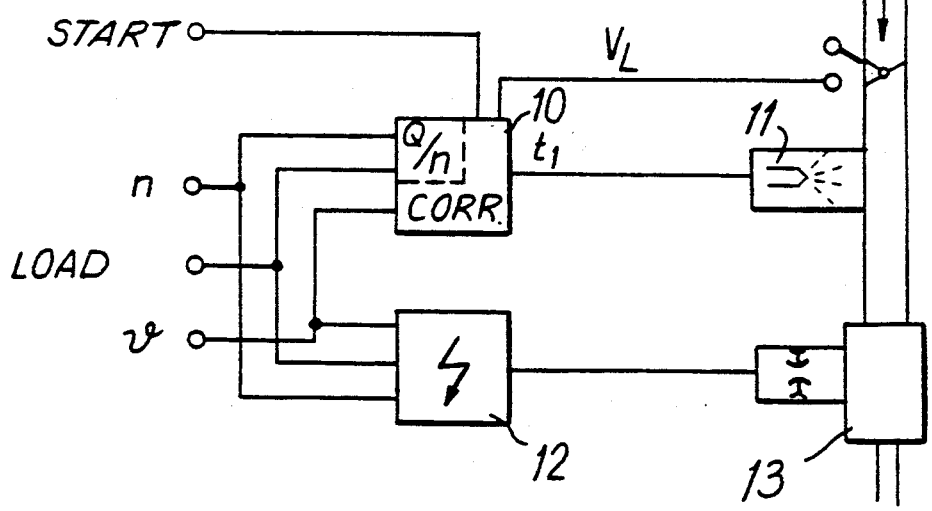
FIG. 1 shows, highly schematicised, a circuit diagram of an electronic internal combustion engine control system.

According to FIG. 1, the electronic internal combustion engine control system has a signal generator stage 10 for injection pulses ti, with which injection valves 11 are controlled; also shown, for a more comprehensive understanding, is a signal generator stage 12 for controlling the ignition by means of spark plugs 13. The main input parameters for the two signal generator stages 10 and 12 come from sensors for the engine speed, temperature and load. In addition, a start signal is supplied to the injection signal generator stage 10.

The highly schematicised arrangement shown in FIG. 1 merely serves to illustrate the range of application and action of the invention; determinative factors for the invention are the type and design of the function progressions during starting, as indicated in the diagrams which follow. Therefore, a specific circuit for realising the functions, sequences and control programs used by the invention can also be dispensed with, as current internal combustion engine control systems are computer-controlled or microprocessor-controlled and the respective functions and values can be stored in and called from a memory at certain program points. The diagram and function progressions shown in the drawing therefore illustrate basic functional effects of the invention, it being self-evident that the individual modules and blocks used respectively for realising the invention may be designed using analog, digital or hybrid techniques, or else, as mentioned above, may be realised by corresponding programs of program-controlled digital systems, in other words microprocessors, microcomputers, and the like.

Figure 2:
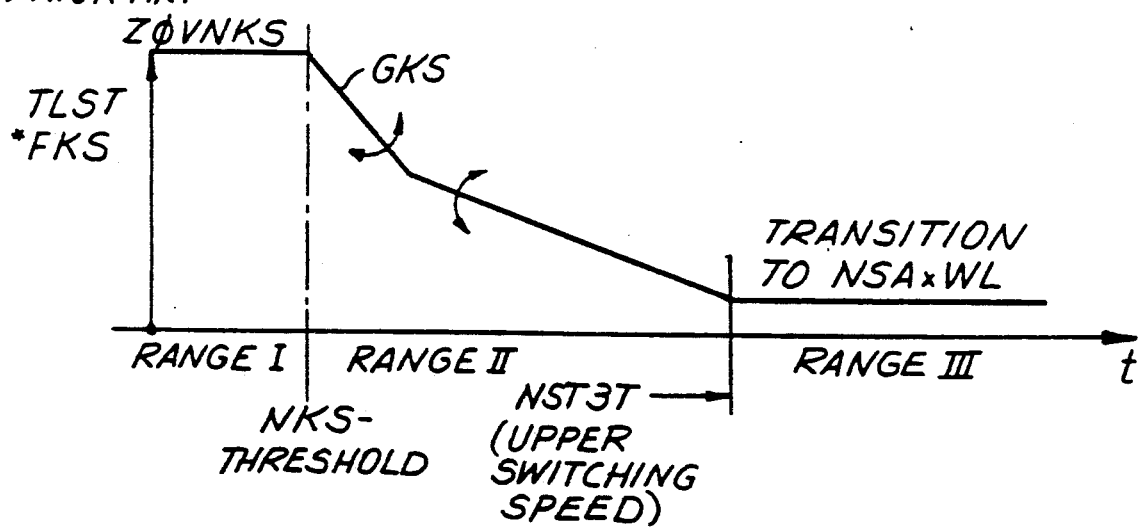
FIG. 2 shows the progression, known per se, of a former cold-start function from which the designated factors previously necessary for the determination of this function can be taken.
Figure 4A:
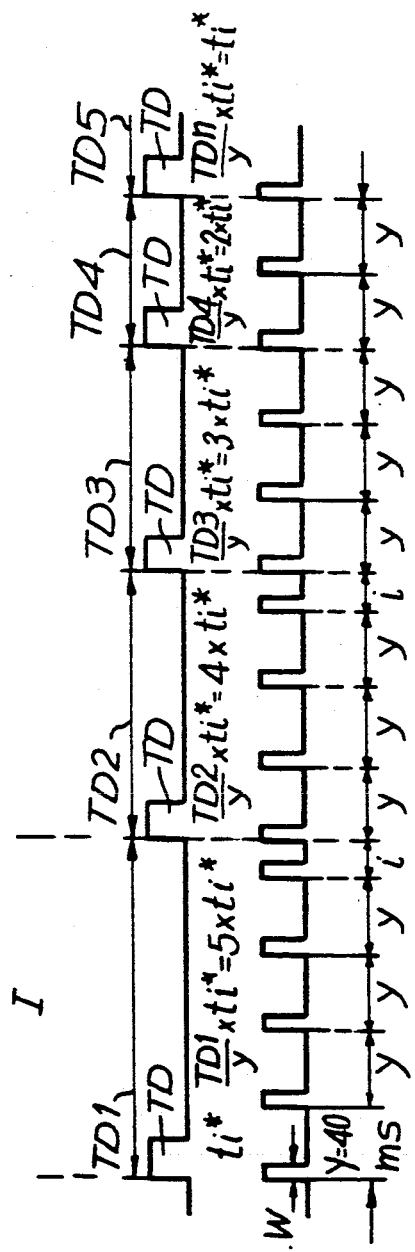
FIG. 4a shows, in relation to the occurrence of ignition points (TD) in time, a sequence of the CS short-duration injection pulses, ti*.
Figure 4B:
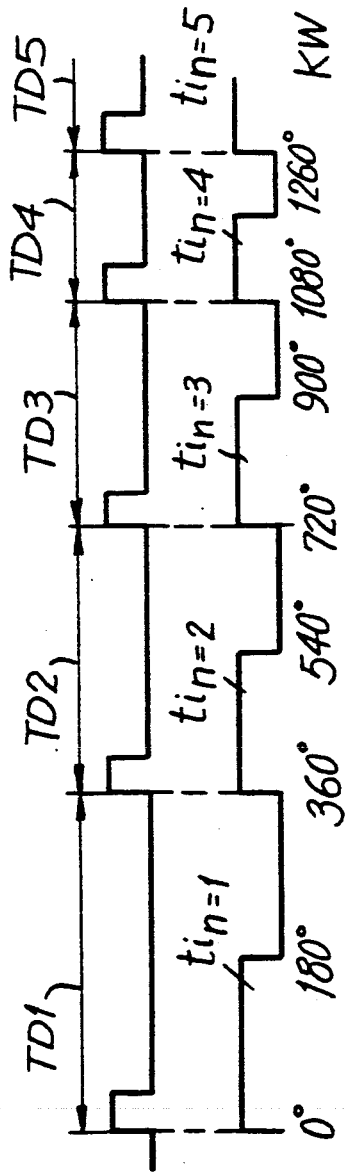
FIG. 4b shows the function of prior art injection pulses $ti_n$ (where n is the number of ignitions TD)
Figure 5:
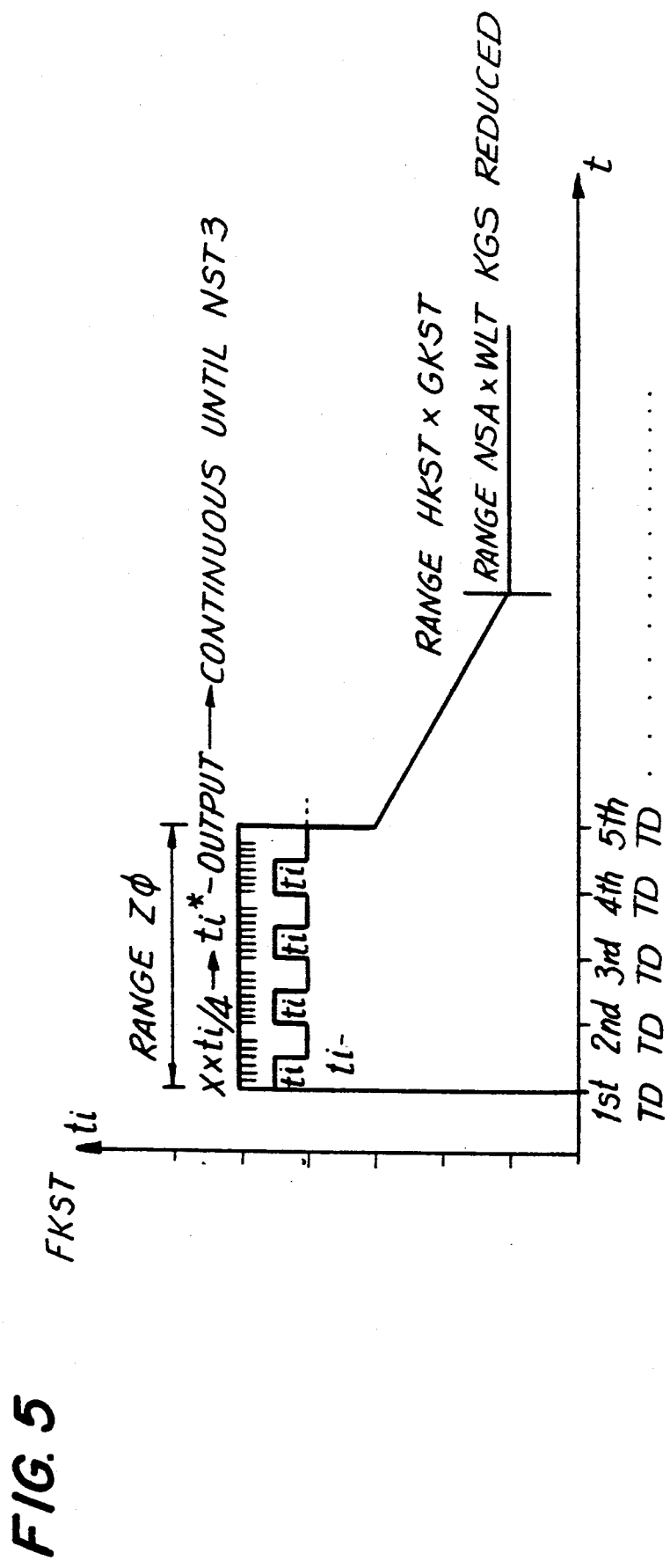
FIG. 5 shows a further exemplary embodiment of the invention, with a different sequence of cold-start injection pulses ti*.

In the case of prior art cold-start function shown in FIG. 2, the overall cold-start injection time is subdivided into a range I (plateau region ZφVNKS) in which the injection time could be determined for example by the prior art injection pulses $ti_n$ shown in FIGS. 4b and 5, with switching states of high-to-low, determining the injection time, alternating every 180° of crank shaft rotation KW, so that there is always full injection for a 180° KW and every injection pulse is interrupted for the subsequent 180° KW; in the following range II of cold-start feed or fuel delivery reduction with the reduction functions GKS and HKS (general steep-drop function progression) takes place from a lower starting speed threshold NKS until an upper starting speed NST3T has been reached; in the following transition into the range III, the cold-start control is reduced and is followed by the after-start boosting (NSA) or warm-running functions (WL). According to the prior art cold-start function the amount of fuel necessary for starting an internal combustion engine was supplied in an intermittent way, related in each case to ignition points and by corresponding lengthening of the pulse durations for the cold start.

The invention moves away from this concept and proposes dividing the duration of the prior art injection pulses by a preset division factor Z and, using the succession of pulses ti* of reduced pulse width thus obtained, for controlling the injection valves repeatedly, on a linear time base or scale within every ignition timing interval during the cold starting operation. If needed, a further factor is used as a basis for the injection valve control; the beginning of the first injection pulse in each sequence being synchronised furthermore to the recording or reading of battery voltage UBatt and initiated by a signal related to respective ignition points or pulses TD. Hereafter, the pulses ti* of reduced width, will be referred to as cold-start short-duration injection pulses ti* or in abbreviated form as short cold-start injection pulses ti*.

A first example of sequences of cold start short injection pulses ti* shown in FIG. 4a illustrates the present invention. During starting, coinciding with the ranges I and II, referred to the time base or scale, of the curve progression of FIG. 2, the prior art injection pulses ti (FIG. 4b), which occur every 180° of crankshaft rotations KW and have variable pulse width and pulse spacing depending on ine speed, are replaced every ignition time interval $TD_n$ by a sequence x=5, 4, 3, 2, 1 of the short-duration injection pulses ti* each occurring at a preset constant time interval y (where x is a quotient of the variable ignition time interval $TD_n$ and the preset time interval y between the ti* pulses).

Figure 3:
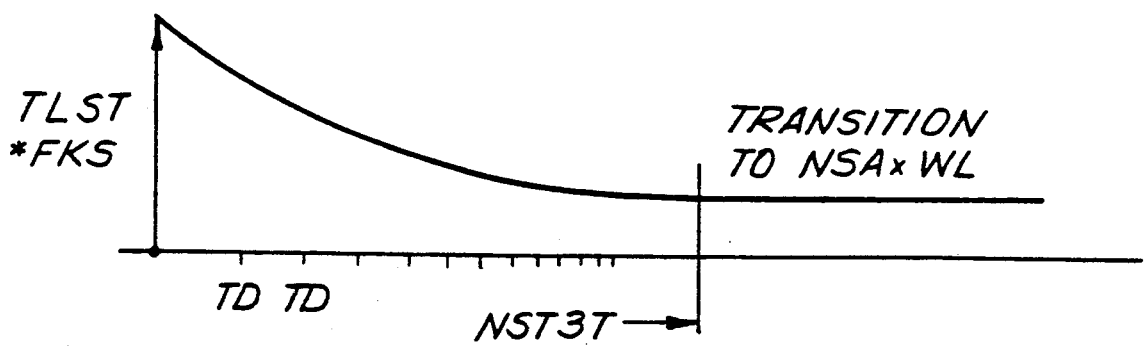
FIG. 3 shows the progression of the new cold-start function (CS function) realized by the invention.

Going over to numerical values, instead of the prior art single injection pulse ti per 180° KW, a short fuel pulse ti* is injected at linear time intervals y (every y=40 ms, for example), by corresponding actuation of the final stage or generator 10 for the injection valve or valves 11. The variable quotient $$x = \frac{TD_n}{y}$$

depends on the engine speed reached during starting, in other words on the frequency of occurrence of the ignition points or pulses TD and thus on the length of respective ignition intervals $TD_n$. The variable quotient x determines as to how many of the short injection pulses ti* fit into a particular $TD_n$ interval. According to FIG. 4a, a sequence five short injection pulses ti* is placed in a first ignition time interval TD1 between a first a second ignition pulse TD, while with an increase of engine speed n, only four short injection pulses ti* fit in the second interval TD2. As can be readily appreciated, this also results in a feed or fuel delivery reduction, achieved in a comparatively simple and therefore also particularly advantageous way, namely by issuing less short injection pulses ti* with ignition intervals $TD_n$ becoming shorter. This feature also produces the continuous transitory progression of the cold-start function corresponding to FIG. 3 simply with the ignition timing intervals becoming smaller up to reaching the upper cold starting speed threshold NST3T. The sequence x of uniformly spaced cold-start injection pulses ti* which fit in each case into an ignition timing interval $TD_n$ has the effect of producing a substantially better atomization of the fuel which is so fine that ignitability is already achieved virtually immediately after the beginning of starting. As illustrated in FIG. 4a, the preset constant time interval y between respective short duration fuel injection pulses ti* is less than a minimum half-period of the crankshaft rotation occurring at a time interval TD4 between the fourth and the fifth ignition pulse TD, and the width or duration (W) of the control pulses ti* being less than the duration of the ignition pulse TD. It will be also seen that at the beginning of every ignition pulse TD, a new sequence $$x = \frac{TD_n}{y} \cdot ti^*$$

is initiated while the preceding sequence x is interrupted during the last time interval i which is less than the constant interval y.

It should be pointed out that the distribution of a plurality of short-duration cold-start injection pulses ti* attained by the present invention on a linear time base or scale cannot be mixed up and nor is it in any relationship with the measure, known per se, of issuing in certain circumstances during the starting operations of internal combustion engines an intermediate pulse between the normal, and also normally calculated, injection pulses, irrespective of whether said intermediate pulse is produced coinciding with an injection pulse or not.

To facilitate understanding of the present invention and to simplify explanation of the invention, the technical meaning of frequently recurring parameter designations are first explained below with reference to the following table:

| | |
|---|---|
| FKST = | cold start fuel quantity factor (T = from table) = f(θ) |
| TLST = | (basic) injection time $t_L$ during starting (ti denotes the end corrected injection pulse) |
| TIH,L = | injection time + voltage correction from high and low bytes |
| TMOT = | engine temperature (θ) |
| NST2 = | (re)commencement speed threshold of KSIANZ upon dropping of the speed below a preset value (eg. 341 rpm) |
| KSIANZ = | number of ti/TD at n < NST2 < 48 TD |
| HKSIAN = | table for number of injections per TD in preset steps (eg. 8 TD) from 0 TD to 48 TD |
| NST3T = | table for upper starting speed = f (θ) |
| KSSTE1 = | parameter for ti slope variation |

In another exemplary embodiment shown in FIG. 5, the prior art progression of the cold-start injection pulses ti can also be seen in the plateau range Z φ; the invention achieves the effect that the ejected so-called FKST-ti fuel quantity is atomized so finely that an ignitable mixture is produced spontaneously and immediately. At the same time, the quantity of fuel ejected (FKST-ti) for the starting range per ignition (TD) is divided in such a way that x short pulses ti* are produced in the respective ignition timing intervals in accordance with the formula x·ti/z, with the divisor, for example and preferably, z=4. This can be realized, for example, by a counter being actuated at a preset frequency, for instance 100 Hz, a time slot pattern of x pulses being formed with the first ignition pulse (1st TD) by a computer, as indicated in the progression of FIG. 5, with which slot pattern the final stage for the injection valves is controlled. Thus, x ti* pulses are issued between two ignitions, the x-fold ti* being restarted at the next interrupt occurring whenever the respective ignition interval $TD_n$ is greater than the interval y of the xth pulse ti* in the corresponding pulse sequence. If a $TD_n$ interval <x ti* is produced, the counting is interrupted, whereby here, too, the desired reduction to a preset amount can be achieved. Incidentally, in the diagrammatic representation of FIG. 5, the ignition points or pulses TD are set at the same time intervals. As soon as the upper starting speed NST3T is reached (transition into after-starting and warm-running), the frequency control is cancelled. Finally, these sequences of short injection pulses ti* for cold starting also bring about the advantages that the dependence on the battery voltage influencing the motor speed, on the air humidity and on the spraying quality of the injection valves is considerably less.

The preferred numerical values for the divisor z lie between 4 and 16, within which range the sub-division of the plurality of the cold-start injection pulses can be preferably arranged, taking into account the change of pickup and dropout times of the injection valves with low battery voltage.

The number x of short pulses ti* in each sequence can also be controlled by a program, for instance, as a function of the crankshaft rotation KWU, or using as a basis a stored HKSIAN table, as already indicated above in the definition of the parameter designations, in other words, $x=f(KWU)$ or $x=f(HKSIAN)_{TAB}$.

Figure 6:
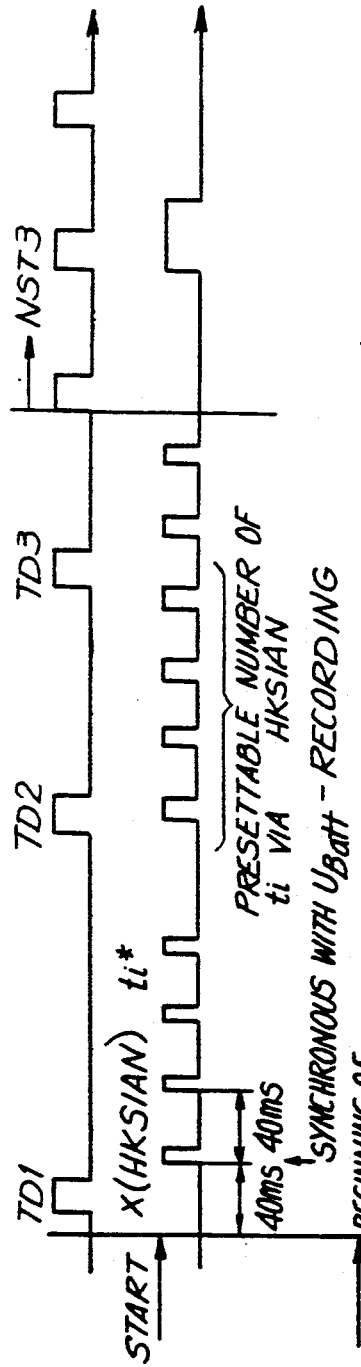
FIGS. 6, 7 and 8 show, similarly to FIG. 4, sequence diagrams of short pulses, referred to the respective $TD_n$ intervals, with determination of the ti* number x from a stored table, with additional indication of slopes in the case of a controlled increase of the ti* width and with additional indication of the engine speed n.

The progression shown in FIG. 6 shows the number x of short cold-start injection pulses ti* obtained from the stored HKSIAN table, a time interval y=40 ms between the individual short injection pulses ti* being used as a time base.

At the same time, and this is a further essential feature of the present invention, in order to eliminate the influence of the usually severely fluctuating or low battery voltage during a cold start, in other words to take into account the voltage-dependent pickup times of the injection valves, the condition of the battery is recorded or read and a proportional correction added as $f(U_{BAtt})$ at each injection period. This $U_{BAtt}$ recording or reading takes place synchronously in the preset time intervals y between the ti* pulses, in other words in this case every 40 ms, so that the duration of a ti* short fuel pulse injected during the starting operation meets the following formula:

$$ti^* = FKST(\theta) \cdot TLST/Z + t_s \, (U_{Batt})$$

wherein $t_s$ is the correction pulse added as a function of $U_{BAtt}$.

In the case of the dependence of the number x of short injection pulses ti* on a tabular value (HKSIAN), the cold-start feed supplied in this way during the ignition intervals $TD_n$ can be reduced, on the basis of the instructions from the table, over the increasing crankshaft revolutions in order to prevent the mixture becoming too rich. The number of injections x between two ignitions is thus a function of the time ($\Delta t$ from TD to TD) after starting. This reduction takes place by taking into account the recorded number of crankshaft revolutions per unit of time, and not by means of the expiry of the period between two TD pulses, as in the case of the sequences of FIG. 4. Here, the possible choice of the short pulse time interval y in each case also comes into play.

Figure 7:
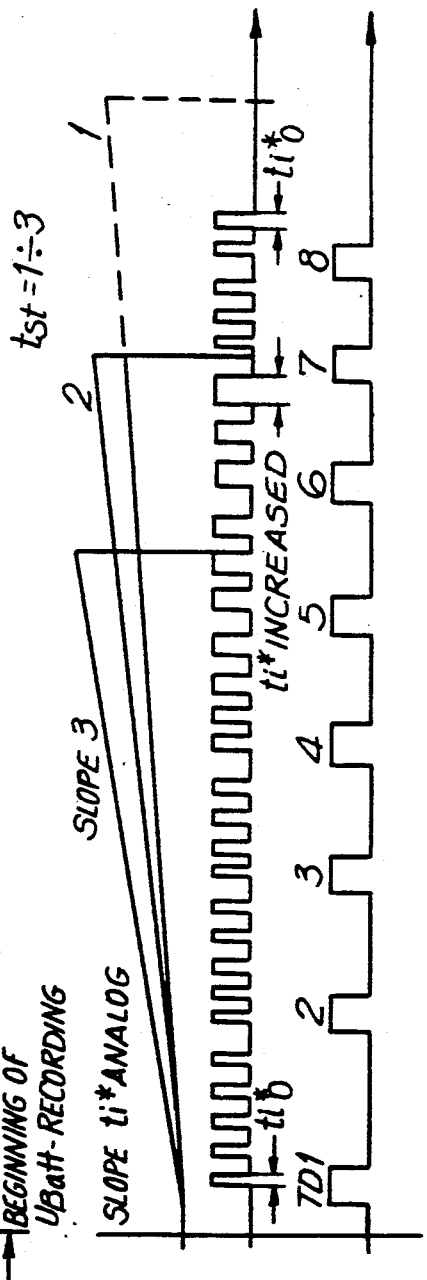

Furthermore, in certain circumstances fuel problems in terms of the amount fed may arise during the transition from the start phase to the after-start phase, during which injection is then again every 360° of crankshaft rotation KW. In order to avert this problem, it is possible, in accordance with an exemplary embodiment shown in the representation of FIG. 7, for the feed to be increased after a preset or programmable time, which can be determined as the number of TDs from the beginning of starting, i.e. the short pulses ti* increase in width and in their respective relative duration, as FIG. 7 shows, the only distinction which can be made being between the basic injection pulse $ti_o^*$ and an increased injection pulse ti*. Furthermore, this controlled increase of ti* pulses can take place according to a preset number of slope variants, FIG. 7 showing three different slopes 1, 2, 3.

However, this controlled increase must be reversed again whenever the starting operation is not completed within the indirectly preset time (=number of TD pulses from the beginning of starting without controlled increase), i.e. the internal combustion engine has not reached the temperature-dependent speed threshold NST3, in order to prevent the engine dying on account of the over-rich mixture caused by the increased speed.

In order to prevent in general an over-rich mixture, in other words a flooding of the internal combustion engine in the case of a long starting time, the number of ti*/TD after a given number of TD(=48) can, furthermore be reduced to a minimum of one ti*/TD.

Figure 8:
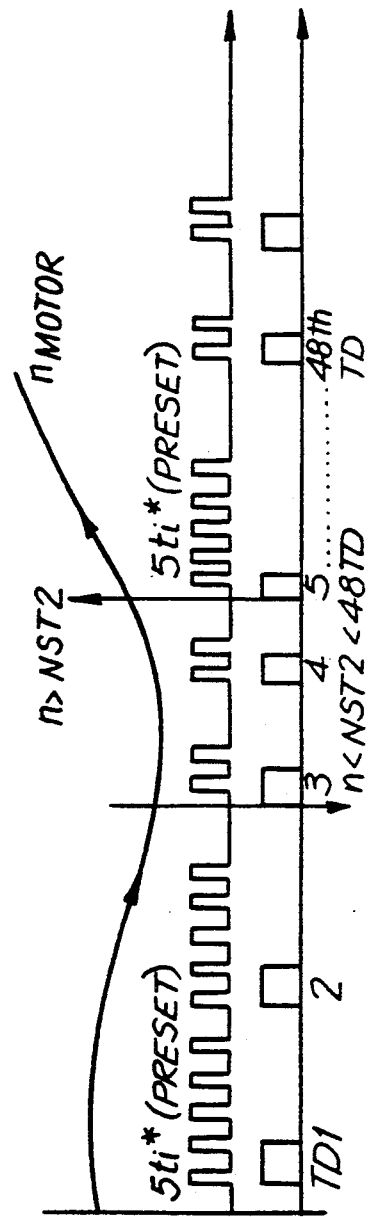

According to the exemplary embodiment of FIG. 8, it is possible to realize a further "flooding prevention" by switching over to a selectable (lower) number of ti*/TD as from a preset lower speed threshold (n threshold NST2), namely if the speed drops below the latter. It can be seen in FIG. 8 that, at TD 3 the engine speed n drops to such an extent that it is lower than NST2, so that as from this point only two ti* short pulses are injected in the case of the exemplary embodiment shown, up to the point TD 5, from which a preset number of ti* short pulses, namely x=5, is again injected until a preset TD number (TD=48) is reached, from which time there is again a reduction in the ti* number, as already mentioned above.

In both cases, when the speed drops below the speed threshold NST2 and when it rises above this speed threshold, the number of the short pulses ti* to be supplied is read from the preprogrammed tables mentioned, KSIANZ and HKSIAN.

Figure 9:
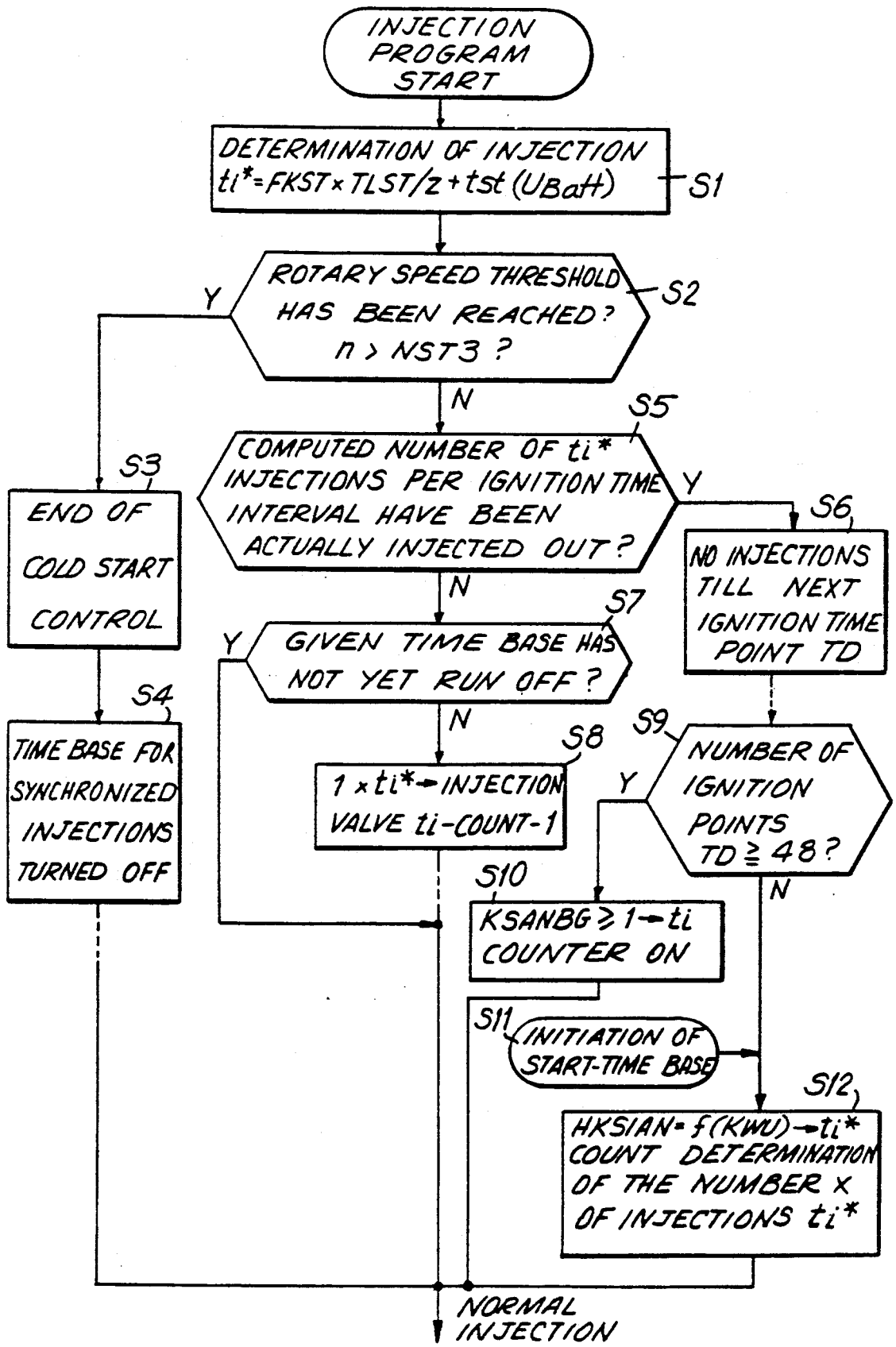
FIG. 9 shows a flowchart of a fuel injection program for implementing the embodiment according to FIG. 5.
Figure 11:
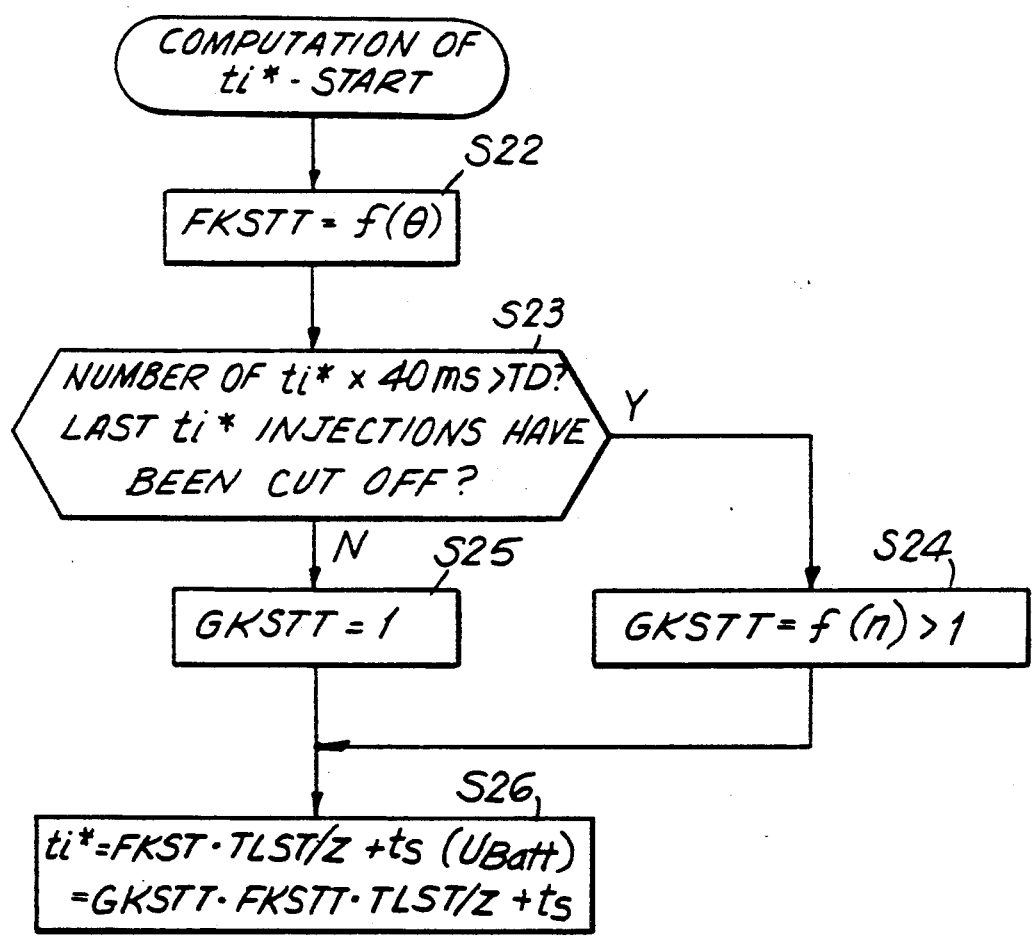
FIG. 11 shows a program for computing a cold-start injection pulse ti* according to the invention.

FIG. 9 shows a flowchart of a computer program for controlling the cold-start fuel injection according to the process shown in FIG. 5. In the first program step S1, there is determined the duration of a short cold-start injection pulse ti*, computed according to the formula $ti^* = FKST \cdot TLST/Z + t_s \, (U_{BAtt})$ in a separate program (FIG. 11). In the second step S2 it is tested, whether the upper engine speed threshold has been reached (n> =NST3). If YES, the cold-start control is terminated in step S3, and in the following step S4, a time base for synchronized injections is turned off and a normal or after-start injection control is initiated. If the threshold NST3 has NOT been reached, it is tested in step S5, whether a computed number X of the cold-start injection pulses ti* has been injected out during the current ignition interval. If YES, injections till the next ignition time point TD are interrupted (step S6). If NO, it is tested in step S7, whether a pregiven time scale or base has not yet expired. If NOT, an additional cold-start injection pulse ti* is applied to the injection valve in step S8. At the same time, the count of a counter of the cold-start injection pulses is incremented by 1. Upon the occurrence of a next ignition pulse TD, it is tested in step S9 whether the number of cold-start ignition intervals has reached a given limit, e.g. TD$_n$> =48. If YES, a stored table KSANBG is read. If the read out value is =1, the computer starts counting the injection pulses. If the limit of 48 TD$_s$ has NOT been reached, then in step S11, the time base is initiated and, in the next step S12, the stored table HKSIAN=f(KWU) is read to find out the requisite number X of the cold-start injection pulse ti* and the counter of these pulses is turned on.

The steps S5–S8 are repeated until the pregiven time base has expired, whereupon the normal or after-start injections take place.

Figure 10:
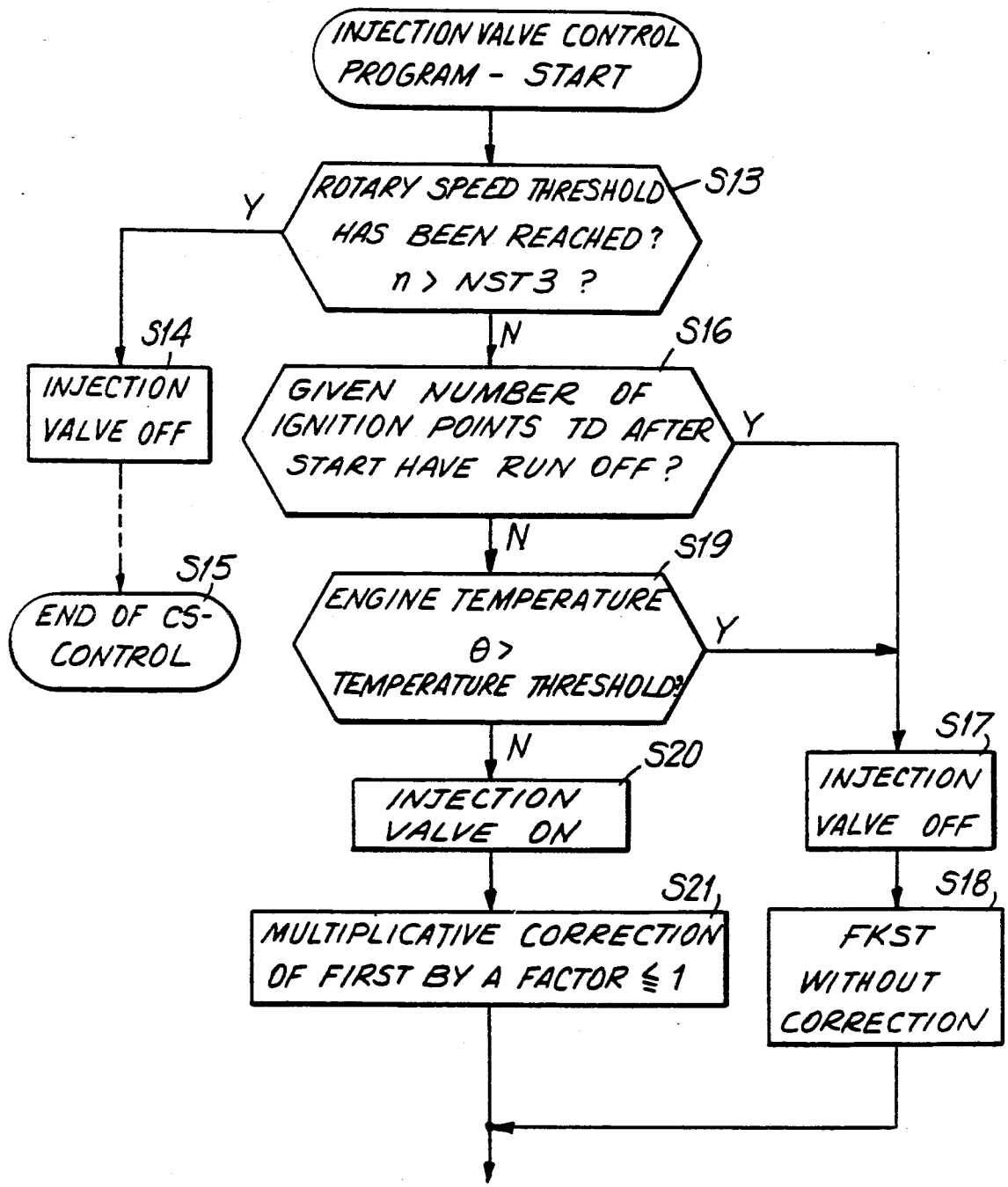
FIG. 10 shows a flowchart of a program for controlling fuel injection valves.

The injection valve control program shown in FIG. 10 tests in step S13 whether the upper engine speed threshold NST3 has been reached (n> =NST3). If YES, then in step S14 the injection valve is turned off and in the next step S15 the cold-start injection control is terminated. If the threshold NST3 has NOT been reached, then in step S16 it is tested, whether a pregiven number of ignition pulses TD after start have run off. If YES, then in step S17 the injection valve is turned off and the fuel quantity function FKST is taken without correction. If the number of ignition pulses has NOT reached the given limit, it is tested in step S19 whether the engine temperature is greater than a pregiven temperature threshold. If YES, the program jumps back to step S17. If NOT, the injection valve is turned on in program step S20. In the next step S21, a multiplicative correction of the function FKSt, by a factor which is =1, takes place. Thereafter, the fuel quantity function FKST, with the correction according to step S21 or without correction according to step S18, is advanced for further processing.

The flowchart according to FIG. 11 corresponds to step S1 in FIG. 9. In step S22, the cold-start factor FKSTT is computed as a function of temperature. In the next step S23 it is tested, whether the product of a number (x) of the cold-start injection pulses ti* times a pregiven constant time interval y=40 ms, is greater than a corresponding ignition time interval. For this purpose it is tested whether the last injections have been cut off. If YES, the function GKSTT=f(n) is set to be greater than 1. If NOT, the function GKSTT is set to 1. In the following step S26, the duration of the cold-start injection pulse ti* is computed according to the formula:

$$ti^* = FKST \cdot TLST/Z + t_s(U_{Batt})$$
$$= GKSTT \cdot FKSTT - TLST/Z + t_s,$$

and the program advances to step S2 in FIG. 9.

What is claimed as new and desired to be protected by Letters Patent is set forth in the appended claims:

We claim:

1. Process for cold-start control in an internal combustion engine having an electronic control system which includes stages for generating control pulses (ti) for fuel injection valves and means for increasing or reducing fuel metering during the starting, comprising the steps of
    detecting engine speed (n), crankshaft rotation (KW) and engine speed (n);
    generating at the beginning of time intervals (TD$_n$) between consecutive ignition pulses a sequence of short cold-start injection pulses (ti*) spaced apart one from the other by a constant time interval (y) which is less than a minimum half-period of the crankshaft rotation during starting and is independent of engine speed;
    determining a required number (x) of the cold-start injection pulses in respective sequences as a function of the crankshaft rotation; and
    upon the occurrence of a next ignition pulse (TD), interrupting the generation of the current sequence and restarting the generation of a next sequence of said cold-start injection pulses.

2. Process according to claim 1, wherein the cold-start injection pulses are generated at the beginning of time intervals delimited by predetermined values of the detected engine speed.

3. Process according to claim 1, wherein the generation of the cold-start injection pulses ti* is interrupted after reaching an upper threshold of starting speed NST3T.

4. Process according to claim 1, wherein the amount of fuel to be ejected per ignition during the cold-starting phase is divided into the required number (X) of cold-start injection pulses (ti*) having the same time interval between one another.

5. Process according to claim 1, wherein the pulse duration (W) of each cold-start injection pulse (ti*) less than the duration of respective ignition pulses, is determined by a quotient $$x = \frac{TD_n}{y},$$

wherein y is said constant time interval between the cold-start injection pulses and TD$_n$ is an ignition interval.

6. Process according to claim 5, wherein said constant time interval (y) between the cold-start injection pulses (ti*) is independent of the quotient (z), whereby with long ignition intervals (TD1/TD2/TD3 . . . ), more and, with short ignition intervals, less cold-start injection pulses fall into these intervals.

7. Process according to claim 1, wherein the required number (x) of the cold-start injection pulses (ti*) is determined from a stored table (HKSIAN) as a function of the speed of crankshaft rotation (x=f(KWU)).

8. Process according to claim 7, wherein the stored table (HKSIAN) contains the required number (x) of injections for each successive ignition interval determined as a function of time from a TD pulse to a next TD pulse from the beginning of cold starting (0 TD) to a preset total number (48 TD) of ignition intervals.

9. Process according to claim 1, wherein, synchronously with the generation of each cold-start injection pulse (ti*), a battery voltage recording is carried out and, to take into account the voltage-dependent pickup times of the injection valves, a proportional battery voltage correction is carried out additively in such a way that the duration of respective cold-start injection pulses ti*=FKST($\theta$)·TLST/Z+ts (U$_{BAtt}$) wherein FKST($\theta$) is an engine temperature dependent quantity of fuel to be ejected per an ignition time interval, TLST is injection time during starting, and t$_s$ (U$_{Batt}$) is the added battery voltage dependent injection time during starting.

10. Process according to claim 1, wherein the respective cold-start fuel feed supplied between two ignitions is reduced with increasing crankshaft revolutions.

11. Process according to claim 10, wherein the number (x) of cold-start injection pulses (ti*) in successive sequences is reduced as a function of the time after starting.

12. Process according to claim 10, wherein the number (x) of cold-start injection pulses (ti*) in respective sequences is reduced as a function of the number of ignitions (TD) after starting.

13. Process according to claim 11, wherein, after a preset time period from beginning of starting, the cold-start fuel feed is increased by increasing the duration of the cold-start injection pulses to facilitate the transition from the start phase to the after-start phase.

14. Process according to claim 11, wherein, after a preset number of ignition pulses (TD) from beginning of starting, the cold-start fuel feed is increased by increasing the duration of the cold-start injection pulses to facilitate the transition from the start phase to the after-start phase.

15. Process according to claim 13, wherein the controlled increase is reversed whenever the starting operation is not completed within the preset time period by reaching a temperature-dependent speed threshold (NST3).

16. Process according to claim 7, wherein, to avoid an over-rich mixture and dying of the engine, if the speed drops below a preset further speed threshold (NST2), the number (x) of cold-start injection pulses determined from said stored table (HKSIAN) is reduced to a lower number.

17. Process according to claim 16, wherein a further stored table (KSIANZ) is provided for determination of the number (x) of the cold-start injection pulses (ti*) per time interval (TD) if the speed drops below the second speed threshold (NST2).

18. Process according to claim 13, wherein the controlled increase in the fuel feed takes place in accordance with preset slope variants of the duration of the cold-start injection pulses on a time scale.

19. Process according to claim 18, wherein, after expiry of the preset time period, the number (x) of the cold-start injection pulses (ti*/TD) is reduced to a preset lower number, with a minimum of one cold-start pulse (ti*) per an ignition interval TD.

20. Process according to claim 1, wherein the control system is reset when the cold starting process is not terminated by means of reaching a temperature-dependent speed threshold (NST3) within an allowed time period after the starting process.

21. Process for cold start control in an electronic internal combustion engine system with signal generating stages for the fuel metering and ignition control, wherein an increased fuel proportioning is effected during the cold starting, comprising the steps of determining for every time interval between consecutive ignition pulses within a cold-start range delimited by an upper starting speed limit an auxiliary cold start injection pulse (ti) having an adjustable duration; generating on the basis of the respective auxiliary injection pulses successions of uniformly spaced short-duration injection pulses (ti*) whose quantity x in the respective successions is determined by dividing the duration of the corresponding auxiliary cold-start injection pulse (ti) by a predetermined divisor z, and interrupting the generation of the short-duration injection pulses at the upper starting speed limit (NST3).

22. Process according to claim 21 wherein the divisor z is between 4 and 16.

23. Process according to claim 21 wherein each succession of the short-duration injection pulses is started in synchronism with an ignition time signal, and interrupted as the length of the succession exceeds a corresponding ignition time interval.

24. Process for increasing fuel proportioning during the cold start of an electronic internal combustion engine system with signal generating stages for the fuel metering and ignition control, and with means for detecting angular positions (KWU) of the crankshaft, comprising the steps of storing in a storage a table (HKSIA) of values X=f (KWU) each corresponding to a predetermined quantity of cold-start injection pulses assigned to time intervals between consecutive ignition signals within a cold start range delimited by an upper starting speed limit; generating successions of uniformly spaced cold-start injection pulses whose frequency exceeds by a multiple the frequency of the ignition signals; retrieving according to a program the stored values X from the table (HKSIA) as a function of the detection of predetermined angular positions (KWU) of the crankshaft, and controlling the quantity of the cold-start injection pulses according to the retrieved values X.

25. Process according to claim 23 further comprising the steps of detecting fluctuations of power supply voltage ($U_{BAtt}$) during the cold start, and correcting the duration of the respective cold-start injection pulses in respective successions as a function of the detected voltage fluctuations.

26. Electronic internal combustion engine control system for implementation of the process for cold-start control, comprising control signal generator stages for controlling the fuel metering and the ignition, means for forming, during cold starting, a preset time slot pattern in respective ignition timing intervals; means for generating a sequence having a preset number (x) of cold-start injection pulses (ti*) in the ignition timing interval, and means for applying the injection pulses to a final stage for controlling injection valves; means for determining the duration of the respective cold-start short-duration injection pulse (ti*) on the basis of a preset divisor z, by which a normal injection pulse (ti) whose duration corresponds to a half-period of the crankshaft rotation during starting is subdivided and is at the same time replaced by said sequence (x) of the cold-start injection pulses (ti*).

27. Electronic internal combustion engine control system for implementing the process for cold start control, comprising signal generating stages for the fuel dosing and the ignition, means for feeding a predetermined quantity of consecutive cold start injection pulses (ti*) which exceeds by a multiple the quantity of injection pulses (ti) normally issued during cold starting per every consecutive ignition time interval, to an end stage for controlling the injection valves, means for interrupting the generation of the cold start injection pulses (ti*) as the ignition time intervals due to speed increase become closer, means for dividing the fuel quantity to be injected out per an ignition interval for the starting range, into the corresponding quantity of cold start injection pulses (ti*) having a uniform time interval relative to one another, the time interval between the cold start injection pulses being independent from a pregiven division coefficient (z) such that more cold start short-duration injection pulses fall into long ignition time intervals (TD1, TD2, TD3 . . . ) and fewer cold start short-duration injection pulses fall into short ignition time intervals.

* * * * *